(12) United States Patent
Santos et al.

(10) Patent No.: US 10,830,889 B2
(45) Date of Patent: Nov. 10, 2020

(54) SYSTEM MEASURING 3D COORDINATES AND METHOD THEREOF

(71) Applicant: FARO Technologies, Inc., Lake Mary, FL (US)

(72) Inventors: João Santos, Stuttgart (DE); Aleksej Frank, Stuttgart (DE); Ahmad Ramadneh, Kornwestheim (DE); Oliver Zweigle, Kornwestheim (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/389,400

(22) Filed: Apr. 19, 2019

(65) Prior Publication Data

US 2019/0339391 A1    Nov. 7, 2019

Related U.S. Application Data

(60) Provisional application No. 62/665,712, filed on May 2, 2018.

(51) Int. Cl.
| | |
|---|---|
| *G01S 17/66* | (2006.01) |
| *G06T 7/246* | (2017.01) |
| *G06T 7/521* | (2017.01) |
| *G01S 17/42* | (2006.01) |

(52) U.S. Cl.
CPC .............. *G01S 17/66* (2013.01); *G01S 17/42* (2013.01); *G06T 7/248* (2017.01); *G06T 7/521* (2017.01); *G06T 2207/30241* (2013.01); *G06T 2207/30244* (2013.01)

(58) Field of Classification Search
CPC ........ G01S 17/66; G01S 17/42; G01S 7/4817; G01S 17/10; G06T 7/521; G06T 7/248; G06T 2207/30244; G06T 2207/30241
See application file for complete search history.

(56) References Cited

U.S. PATENT DOCUMENTS

| | | | |
|---|---|---|---|
| 5,499,306 | A | 3/1996 | Sasaki et al. |
| 7,443,124 | B2 | 10/2008 | Bischoff et al. |
| 8,412,484 | B2 | 4/2013 | Gaspardo et al. |
| 8,705,012 | B2 | 4/2014 | Greiner et al. |
| 8,868,236 | B2 | 10/2014 | Brogardh |
| 9,187,188 | B2 | 11/2015 | Richter et al. |
| 9,664,508 | B2 | 5/2017 | McAfee et al. |
| 2007/0239315 | A1 | 10/2007 | Sato et al. |

(Continued)

*Primary Examiner* — Tat C Chio
(74) *Attorney, Agent, or Firm* — Cantor Colburn LLP

(57) ABSTRACT

A system and method of measuring 3D points is provided. The method includes defining a first frame of reference with a mobile computing device. A second frame of reference is defined with a mobile 3D measurement device. The mobile computing device is moved within a predetermined distance of the mobile 3D measurement device. The first frame of reference and the second frame of reference are registered when the mobile computing device is within the predetermined distance from the mobile 3D measurement device. The mobile computing device is moved along a path to define a trajectory in the first frame of reference. The trajectory is transmitted to the mobile 3D measurement device. The mobile 3D measurement device is moved along the trajectory in response to receiving the trajectory. 3D coordinates of point on an object are acquired with the mobile 3D measurement device.

12 Claims, 9 Drawing Sheets

(56) References Cited

U.S. PATENT DOCUMENTS

| | | |
|---|---|---|
| 2007/0267570 A1 | 11/2007 | Park et al. |
| 2015/0241203 A1 | 8/2015 | Jordil et al. |
| 2016/0129594 A1 | 5/2016 | Telling |
| 2016/0195390 A1 | 7/2016 | Nissen et al. |
| 2016/0264262 A1 | 9/2016 | Colin et al. |
| 2016/0291160 A1* | 10/2016 | Zweigle ................. H04W 4/70 |
| 2016/0313114 A1 | 10/2016 | Tohme |
| 2016/0327383 A1* | 11/2016 | Becker ................ G01B 11/005 |
| 2016/0346936 A1 | 12/2016 | Hietmann |
| 2017/0054965 A1 | 2/2017 | Raab et al. |
| 2017/0075116 A1 | 3/2017 | Gardiner |

* cited by examiner

SYSTEM MEASURING 3D COORDINATES AND METHOD THEREOF

CROSS REFERENCE TO RELATED APPLICATIONS

This application claims the benefit of U.S. Provisional Application Ser. No. 62/665,712, filed May 2, 2018, the entire disclosure of which is incorporated herein by reference.

BACKGROUND

The present application is directed to a system and method of measuring coordinates of a surface of an object, and in particular to a mobile 3D measurement device and a method of programming a trajectory for the mobile 3D measurement device to follow.

A 3D laser scanner time-of-flight (TOF) coordinate measurement device is a type of metrology device that is used for determining coordinates of surfaces of an object. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

A 3D image of a scene may require multiple scans from different registration positions. The overlapping scans are registered in a joint coordinate system. Such registration is performed by matching targets in overlapping regions of the multiple scans. The targets may be artificial targets such as spheres or checkerboards or they may be natural features such as corners or edges of walls. Some registration procedures involve relatively time-consuming manual procedures such as identifying by a user each target and matching the targets obtained by the scanner in each of the different registration positions. Some registration procedures also require establishing an external "control network" of registration targets measured by an external device such as a total station.

In some applications, the measurement device may be coupled to or integrated with a mobile system (e.g. a robotic system) that is capable of autonomously moving along a predetermined path to perform measurements within an area. It should be appreciated that considerable time may be needed to set up the mobile system to identify where the scans should be performed. Typically, the user needs to move the robot around to build a 2D map of the environment, set the path for the robot to follow and finally set the points in the path from where the robot should perform the scans. This planning stage is time consuming and needs to be performed carefully so the outcome is as desired.

Accordingly, while existing systems for measuring and analyzing surfaces are suitable for their intended purposes, what is needed is a system having certain features of embodiments of the present invention.

BRIEF DESCRIPTION

According to one embodiment, a system for measuring three-dimensional (3D) coordinates is provided. The system includes a mobile computing device having a camera and one or more first processors, the one or more first processes being operable to optically determine and track a position of the mobile computing device based on images acquired by the camera as the mobile computing device is moved within an environment, the mobile computing device further having a first communications module. The one or more first processors are responsive to nontransitory executable computer instructions when executed on the one or more first processors to perform a first method comprising: tracking a position of the mobile computing device relative to a first frame of reference; defining a trajectory based on the tracking of the position in response to a first user input; defining one or more scan points in the first frame of reference in response to a second user input. A mobile three-dimensional (3D) measurement device is provided that is operable to acquire a plurality of points on the surface of the object and determine 3D coordinates for each of the plurality of points, the mobile 3D measurement device having a second communications module. The mobile 3D measurement device further having one or more processors that are responsive to executable computer instructions when executed on the one or more processors for performing a second method comprising: defining a second frame of reference; receiving the trajectory and the one or more scan points in the first frame of reference from the mobile computing device; and causing the mobile 3D measurement device to move along the trajectory.

In addition to one or more of the features described herein, or as an alternative, further embodiments of the method may include transmitting a signal with the first communications module when the mobile computing device is within a predetermined distance of the mobile 3D measurement device; and the second method comprising receiving the signal and determining a position of the mobile 3D measurement device in the first frame of reference. In addition to one or more of the features described herein, or as an alternative, further embodiments of the method may include the second method further comprises causing the mobile 3D measurement device to stop at a first of the one or more scan points and acquire the plurality of points on the surface of the object. In addition to one or more of the features described herein, or as an alternative, further embodiments of the method may include defining of the trajectory is in response to a first input from the operator.

In addition to one or more of the features described herein, or as an alternative, further embodiments of the method may include defining of each of the one or more scan points is in response to a second input from the operator. In addition to one or more of the features described herein, or as an alternative, further embodiments of the method may include the second method further comprises transforming the trajectory and one or more scan points into the second frame of reference prior to causing the mobile 3D measurement device to move along the trajectory.

In addition to one or more of the features described herein, or as an alternative, further embodiments of the method may include the first method further comprises transforming the trajectory and one or more scan points into the second frame of reference prior to the one or more second processors receiving the trajectory. In addition to one or more of the features described herein, or as an alternative, further embodiments of the method may include the mobile 3D measurement device is operable to autonomously move along a predetermined path.

According to a further embodiment, a method of measuring 3D points is provided. The method includes defining a first frame of reference with a mobile computing device. A second frame of reference is defined with a mobile 3D measurement device. The mobile computing device is moved within a predetermined distance of the mobile 3D measurement device. The first frame of reference and the second frame of reference are registered when the mobile computing device is within the predetermined distance from the mobile 3D measurement device. The mobile computing device is moved along a path to define a trajectory in the first frame of reference. The trajectory is transmitted to the mobile 3D measurement device. The mobile 3D measurement device is moved along the trajectory in response to receiving the trajectory. 3D coordinates of point on an object are acquired with the mobile 3D measurement device.

In addition to one or more of the features described herein, or as an alternative, further embodiments of the method may include transforming the trajectory from the first frame of reference to the second frame of reference. In addition to one or more of the features described herein, or as an alternative, further embodiments of the method may include transforming of the trajectory is performed by the mobile computing device prior to transmitting the trajectory to the mobile 3D measurement device. In addition to one or more of the features described herein, or as an alternative, further embodiments of the method may include transforming the trajectory is performed by the mobile 3D measurement device after receiving the trajectory from the mobile computing device.

In addition to one or more of the features described herein, or as an alternative, further embodiments of the method may include defining one or more scan points along the trajectory. In addition to one or more of the features described herein, or as an alternative, further embodiments of the method may include the one or more scan points are defined as the trajectory is defined. In addition to one or more of the features described herein, or as an alternative, further embodiments of the method may include stopping the mobile 3D measurement device at a first scan point of the one or more scan points prior to acquiring the 3D coordinates.

Technical effects of embodiments of the present disclosure include providing a method of defining a path along which a mobile 3D measurement system will follow to perform 3D scans of an object or the environment. The defining of the path is performed using a mobile device that may be easily carried by the operator to reduce the time to program the path to the mobile 3D measurement system.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments provided herein relates to a system for measuring 3D coordinates with a mobile 3D measurement device and a method of defining a route for the device to follow and locations where measurements will be performed. Embodiments disclosed herein provide advantages in allowing the defining of a trajectory and the locations of the measurements without first having to move the mobile 3D measurement device through the environment.

Figure 1:
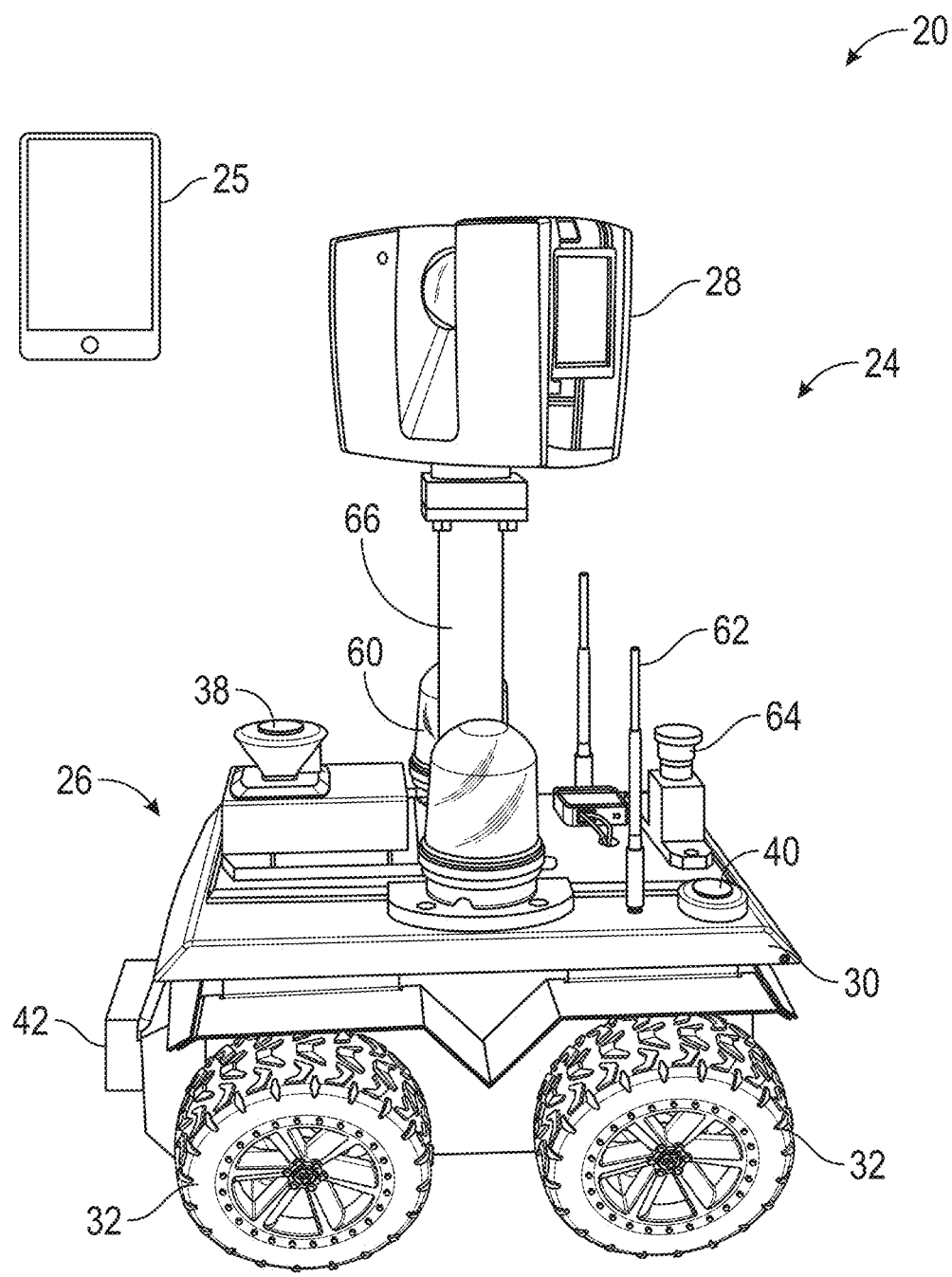
FIG. 1 is a perspective view of an autonomous mobile three-dimensional (3D) measurement device according to an embodiment.

Referring now to FIG. 1, an embodiment is shown of a system 20 for measuring 3D coordinates of surfaces of an object or the environment, such as airplane or an interior environment for example. It should be appreciated that while embodiments herein may refer to the object as being an airplane, this is for exemplary purposes. In other embodiments, other objects may be inspected, such as but not limited to automobiles, trucks, boats, ships, bridges, and interior spaces of buildings for example. In the exemplary embodiment, the system 20 includes a mobile 3D measurement system 24 and a mobile device 25, such as a cellular phone for example. The mobile 3D measurement system 24 is comprised of a mobile platform 26 and an integral 3D measurement device 28. As will be discussed in more detail herein, the mobile platform 26 may be an autonomously operated vehicle that moves along a predetermined route to perform a plurality of scans. The 3D coordinates of points on the surface from these plurality of scans may be used to generate a point cloud of the object or the environment.

In an embodiment, the mobile platform 26 includes a body 30 and a plurality of wheels 32. The wheels 32 are driven by one or more motors (not shown). A steering mechanism is coupled to at least two of the wheels 32 to allow the changing of direction of mobile platform 26. It should be appreciated that the mobile platform 26 may include additional devices, such as but not limited to lights 60, antennas 62 and stop actuators 64 that are mounted to the body 30 as is known in the art. In an embodiment, a post 66 extends from a central area of the top of the body 30. The 3D measurement system 28 is mounted to an end of the post 66 opposite the body 30. In an embodiment, the post 66 is of a fixed length such that the 3D measurement system 28 performs scans at a uniform height from the ground. In another embodiment, the post is a scissor lift that is controllable by the processor 44 to change the height of the 3D measurement system 28 based on the environment in which the system 20 is operating.

Figure 5:
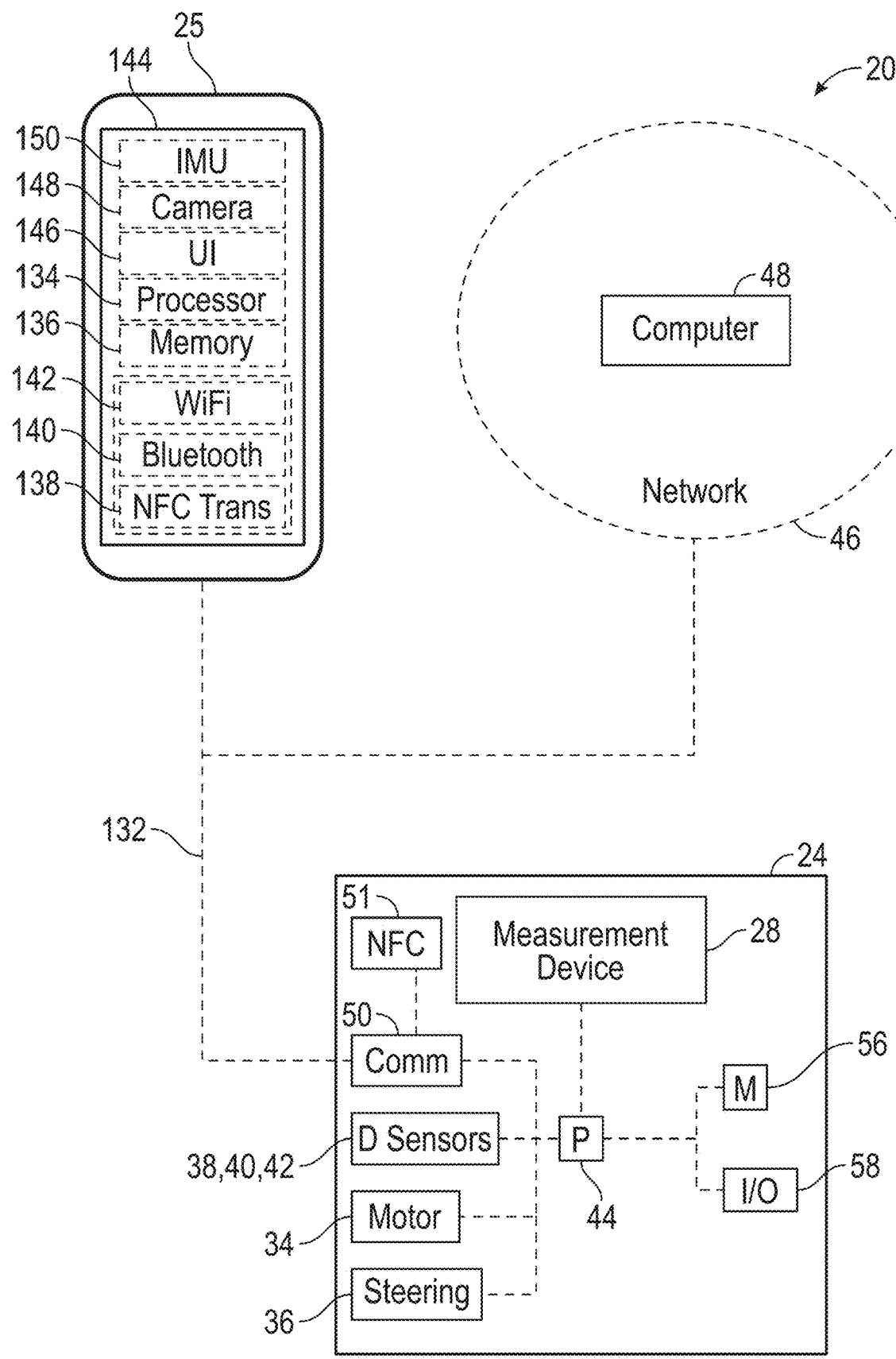
FIG. 5 is a schematic diagram of the mobile 3D measurement device of FIG. 1.

Mounted on the body 30 are a plurality of sensors 38, 40, 42 that provide input to a controller or processor 44 (FIG. 5). In an embodiment, the sensor input is used by the processor 44 to identify obstacles in the area about the mobile platform 26 and allow the processor 44 to change the speed or direction of the mobile platform 26 to avoid contact with an obstacle or a person. In an embodiment, the processor 44, controls the motor 34 and steering mechanism 36 and can operate autonomously along a predetermined route. In an embodiment, the sensor input is further used by the processor 44 to generate a two-dimensional (2D) map of the environment in which the mobile 3D measurement system 24 is operating Processor 44 is a suitable electronic device capable of accepting data and instructions, executing the instructions to process the data. Controller 44 may accept instructions through user interface, or through other means such as but not limited to electronic data card, voice activation means, manually-operable selection and control means, radiated wavelength and electronic or electrical transfer.

In general, processor 44 accepts data from sensors 38, 40, 42 and is given certain instructions for the purpose of comparing the data from sensors 38, 40, 42 to predetermined operational parameters. Processor 44 provides operating signals to the motor 34 and steering mechanism 36. Processor 44 also accepts data from sensors 38, 40, 42, indicating, for example, whether an obstacle is located in a desired travel path. The controller 38 compares the operational parameters to predetermined variances (e.g. probability of contact) and if the predetermined variance is exceeded, generates a signal that may be used to indicate an alarm to an operator or the computer network 42 (FIG. 5). Additionally, the signal may initiate other control methods that adapt the operation of the 3D measurement system 24 such as changing the direction or speed of the mobile platform 26 to compensate for the out of variance operating parameter. The signal may also initiate other control methods that initiate operation of the 3D measurement device 28 when a predetermined location has been reached.

Processor 44 may also be coupled to external computer networks such as a local area network (LAN) 46 and the Internet via a communications circuit or module 50. LAN 46 interconnects one or more remote computers 48, which are configured to communicate with controller 38 using a well-known computer communications protocol such as TCP/IP (Transmission Control Protocol/Internet (^) Protocol), RS-232, ModBus, and the like. Additional systems 24 may also be connected to LAN 46 with the processors 44 in each of these systems 24 being configured to send and receive data to and from remote computers 48 and other systems 24. LAN 46 may also be connected to the Internet. This connection allows processor 44 to communicate with one or more remote computers 48 connected to the Internet. It should be appreciated that communications module 50 also allows communication between the 3D measurement system 24 and a mobile computing device 52 carried by an operator 54. The communications medium between the 3D measurement system 24 and the mobile computing device 52 may be via the network 46, or a direct wireless connection (e.g. Bluetooth, NFC, RFID)

The processor 44 is further coupled to one or more memory devices 56 and an input/output (I/O) controller 58. The memory devices 56 may include one or more random access memory devices, non-volatile memory devices or read-only memory devices.

In an embodiment, the 3D measurement device 28 is a time-of-flight laser scanner. It should be appreciated that while embodiments disclosed herein may refer to a laser scanner, the claims should not be so limited. In other embodiments, the 3D measurement device 28 may be any device capable of measuring 3D coordinates with a desired level of accuracy, such as but not limited to a triangulation scanner, an imager, a structured light scanner, a photogrammetry system, a videogrammetry system or a panoramic camera system for example.

Figure 2:
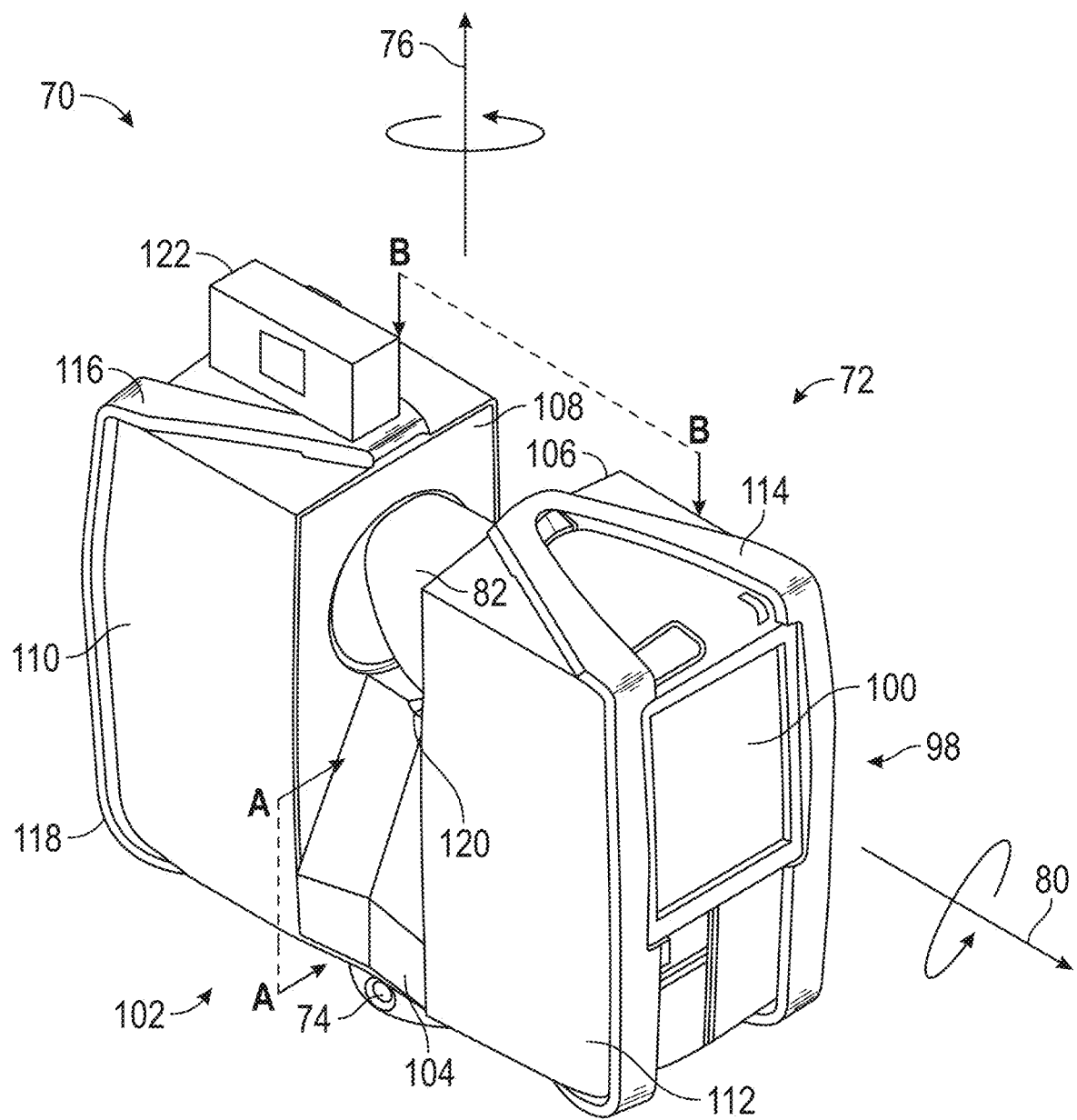
FIG. 2 is a top perspective view of a laser scanner device used on the mobile 3D measurement device of FIG. 1 according to an embodiment.
Figure 3:
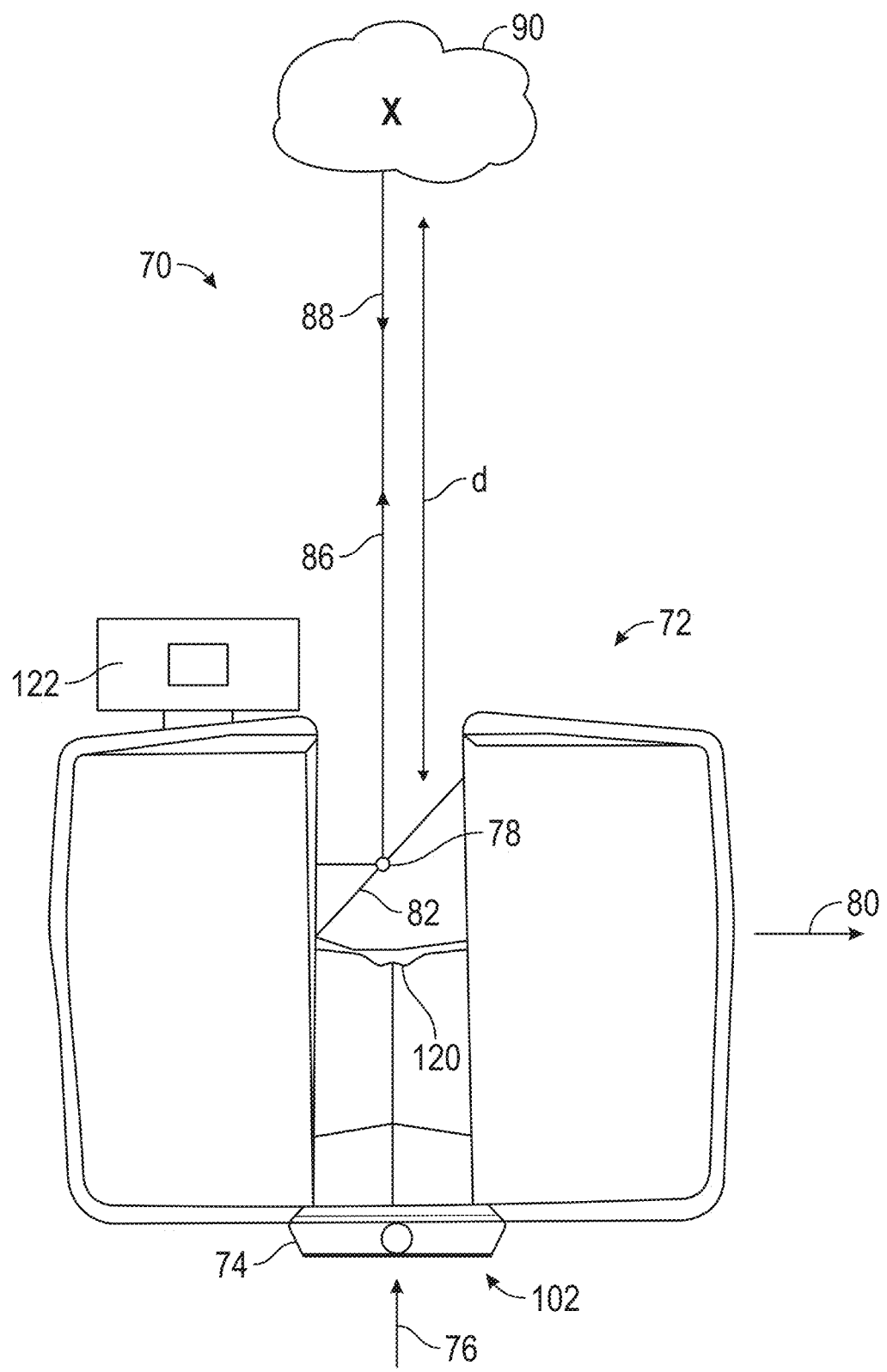
FIG. 3 a front perspective view of the laser scanner device of FIG. 2 according to an embodiment.
Figure 4:
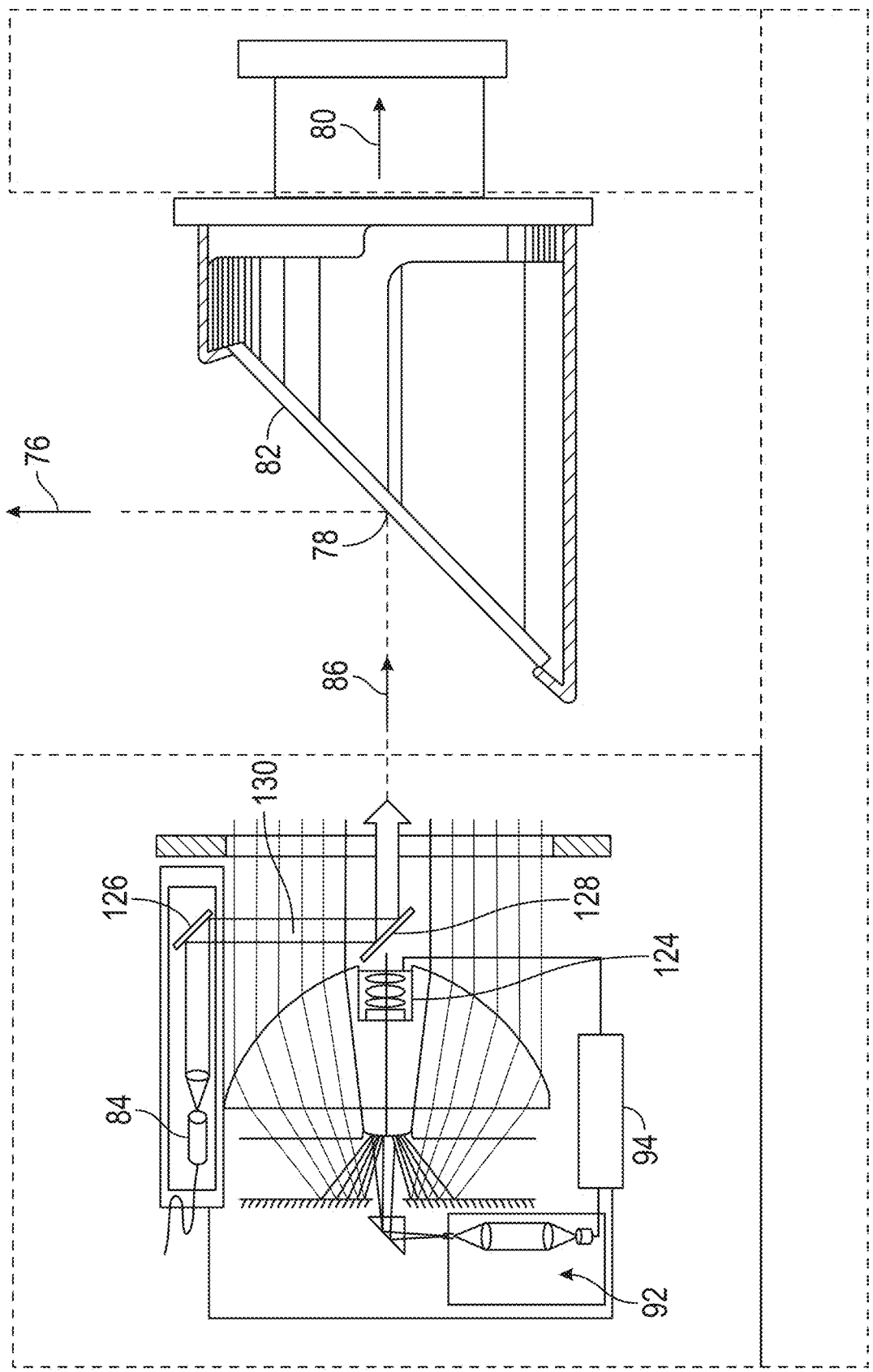
FIG. 4 is a schematic diagram of the laser scanner device of FIG. 2 according to an embodiment.

Referring now to FIGS. 2-4, an embodiment of 3D measurement device is a laser scanner 70 is shown for optically scanning and measuring the environment surrounding the laser scanner 70. The laser scanner 70 has a measuring head 72 and a base 74. The measuring head 72 is mounted on the base 74 such that the laser scanner 70 may be rotated about a vertical axis 76. In one embodiment, the measuring head 72 includes a gimbal point 78 that is a center of rotation about the vertical axis 76 and a horizontal axis 80. The measuring head 72 has a rotary mirror 82, which may be rotated about the horizontal axis 80. The rotation about the vertical axis may be about the center of the base 74. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 72 is further provided with an electromagnetic radiation emitter, such as light emitter 84, for example, that emits an emitted light beam 86. In one embodiment, the emitted light beam 86 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 86 is emitted by the light emitter 84 onto the rotary mirror 82, where it is deflected to the environment. A reflected light beam 88 is reflected from the environment by an object 90. The reflected or scattered light is intercepted by the rotary mirror 82 and directed into a light receiver 92. The directions of the emitted light beam 86 and the reflected light beam 88 result from the angular positions of the rotary mirror 82 and the measuring head 72 about the axes 76, 80. These angular positions in turn depend on movement generated by corresponding rotary drives or motors.

Coupled to the light emitter 84 and the light receiver 92 is a controller 94. The controller 94 determines, for a multitude of measuring points X, a corresponding number of distances d between the laser scanner 70 and the points X on 90. The distance to a particular point X is determined based at least in part on the speed of light in air through which electromagnetic radiation propagates from the device to the object point X. In one embodiment the phase shift of modulation in light emitted by the laser scanner 70 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 70 takes place by rotating the rotary mirror 82 relatively quickly about axis 80 while rotating the measuring head 72 relatively slowly about axis 76, thereby moving the assembly in a spiral pattern. In an exemplary embodiment, the rotary mirror rotates at a speed up to 5820 revolutions per minute. For such a scan, the gimbal point 78 defines the origin of the local stationary reference system. The base 74 rests in this local stationary reference system.

In addition to measuring a distance d from the gimbal point 78 to an object point X, the scanner 70 may also collect gray-scale information related to the received optical power (equivalent to the term "brightness.") The gray-scale value may be determined at least in part, for example, by integration of the bandpass-filtered and amplified signal in the light receiver 92 over a measuring period attributed to the object point X.

The measuring head 72 may include a display device 98 integrated into the laser scanner 70. The display device 98 may include a graphical touch screen 100, as shown in FIG. 2 which allows the operator to set the parameters or initiate the operation of the laser scanner 70. For example, the screen 100 may have a user interface that allows the operator to provide measurement instructions to the device, and the screen may also display measurement results. In an embodiment, the screen 100 also provides a user interface to allow the operator to interact, configure and initiate operation of the mobile platform 26 as well.

In an embodiment, the laser scanner 70 includes a carrying structure 102 that provides a frame for the measuring head 72 and a platform for attaching the components of the laser scanner 70. In one embodiment, the carrying structure 102 is made from a metal such as aluminum. The carrying structure 102 includes a traverse member 104 having a pair of walls 106, 108 on opposing ends. The walls 106, 108 are parallel to each other and extend in a direction opposite the base 74. Shells 50, 52 are coupled to the walls 106, 108 and cover the components of the laser scanner 70. In the exemplary embodiment, the shells 110, 112 are made from a plastic material, such as polycarbonate or polyethylene for example. The shells 110, 112 cooperate with the walls 106, 108 to form a housing for the laser scanner 70.

On an end of the shells 110, 112 opposite the walls 106, 108 a pair of yokes 114, 116 are arranged to partially cover the respective shells 110, 112. In the exemplary embodiment, the yokes 114, 116 are made from a suitably durable material, such as aluminum for example, that assists in protecting the shells 110, 112 during transport and operation. The yokes 114, 116 each includes a first arm portion 118 that is coupled, such as with a fastener for example, to the traverse 104 adjacent the base 74. The arm portion 118 for each yoke 114, 116 extends from the traverse 104 obliquely to an outer corner of the respective shell 110, 112. From the outer corner of the shell, the yokes 114, 116 extend along the side edge of the shell to an opposite outer corner of the shell. Each yoke 114, 116 further includes a second arm portion that extends obliquely to the walls 106, 108. It should be appreciated that the yokes 114, 116 may be coupled to the traverse 102, the walls 106, 108 and the shells 110, 112 at multiple locations.

The pair of yokes 114, 116 cooperate to circumscribe a convex space within which the two shells 110, 112 are arranged. In the exemplary embodiment, the yokes 114, 116 cooperate to cover all of the outer edges of the shells 110, 112, while the top and bottom arm portions project over at least a portion of the top and bottom edges of the shells 110, 112. This provides advantages in protecting the shells 110, 112 and the measuring head 72 from damage during transportation and operation. In other embodiments, the yokes 114, 116 may include additional features, such as handles to facilitate the carrying of the laser scanner 70 or attachment points for accessories for example.

On top of the traverse 104, a prism 120 is provided. The prism extends parallel to the walls 106, 108. In the exemplary embodiment, the prism 120 is integrally formed as part of the carrying structure 102. In other embodiments, the prism 120 is a separate component that is coupled to the traverse 104. When the mirror 78 rotates, during each rotation the mirror 78 directs the emitted light beam 86 onto the traverse 104 and the prism 120. Due to non-linearities in the electronic components, for example in the light receiver 92, the measured distances d may depend on signal strength, which may be measured in optical power entering the scanner or optical power entering optical detectors within the light receiver 92, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 92. Since the prism 120 is at a known distance from the gimbal point 78, the measured optical power level of light reflected by the prism 120 may be used to correct distance measurements for other measured points, thereby allowing for compensation to correct for the effects of environmental variables such as temperature. In the exemplary embodiment, the resulting correction of distance is performed by the controller 94.

In an embodiment, the base 74 is coupled to a swivel assembly (not shown) such as that described in commonly owned U.S. Pat. No. 8,705,012 ('012), which is incorporated by reference herein. The swivel assembly is housed within the carrying structure 102 and includes a motor that is configured to rotate the measuring head 72 about the axis 76.

In an embodiment, an auxiliary image acquisition device 122 may be a device that captures and measures a parameter associated with the scanned volume or the scanned object and provides a signal representing the measured quantities over an image acquisition area. The auxiliary image acquisition device 122 may be, but is not limited to, a pyrometer, a thermal imager, an ionizing radiation detector, or a millimeter-wave detector. In an embodiment, the auxiliary image acquisition device 122 is a color camera.

In an embodiment, a central color camera (first image acquisition device) 124 is located internally to the scanner and may have the same optical axis as the 3D scanner device. In this embodiment, the first image acquisition device 124 is integrated into the measuring head 72 and arranged to acquire images along the same optical pathway as emitted light beam 86 and reflected light beam 88. In this embodiment, the light from the light emitter 84 reflects off a fixed mirror 126 and travels to dichroic beam-splitter 128 that reflects the light 130 from the light emitter 84 onto the rotary mirror 82. The dichroic beam-splitter 128 allows light to pass through at wavelengths different than the wavelength of light 130. For example, the light emitter 84 may be a near infrared laser light (for example, light at wavelengths of 780 nm or 1150 nm), with the dichroic beam-splitter 128 configured to reflect the infrared laser light while allowing visible light (e.g., wavelengths of 400 to 700 nm) to transmit through. In other embodiments, the determination of whether the light passes through the beam-splitter 128 or is reflected depends on the polarization of the light. The digital camera 124 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 76 and by steering the mirror 82 about the axis 80.

Referring now to FIG. 5, an embodiment is shown of the system 20. As discussed above, the measurement system 24 includes a communications module 50 that allows the measurement system 24 to transmit to and receive external data, such as via the network 46 via a communications medium 132. In the illustrated embodiment, the communications module 50 includes a near field communications (NFC) module 51. As will be discussed in more detail herein, the NFC module 51 cooperates with an NFC module in the mobile device to register the coordinate frame of reference of the mobile device 25 with that of the mobile 3D measurement system 24. The communications medium 132 may be a wireless (e.g. WiFi or radio frequency communications) or a wired (e.g. Ethernet). It should be appreciated that the communications medium 132 may also allow direct communications between the mobile computing device 52 and the measurement system 24, such as a wireless communications protocol such as Bluetooth™ provided by Bluetooth SIG, Inc for example.

Figure 10:
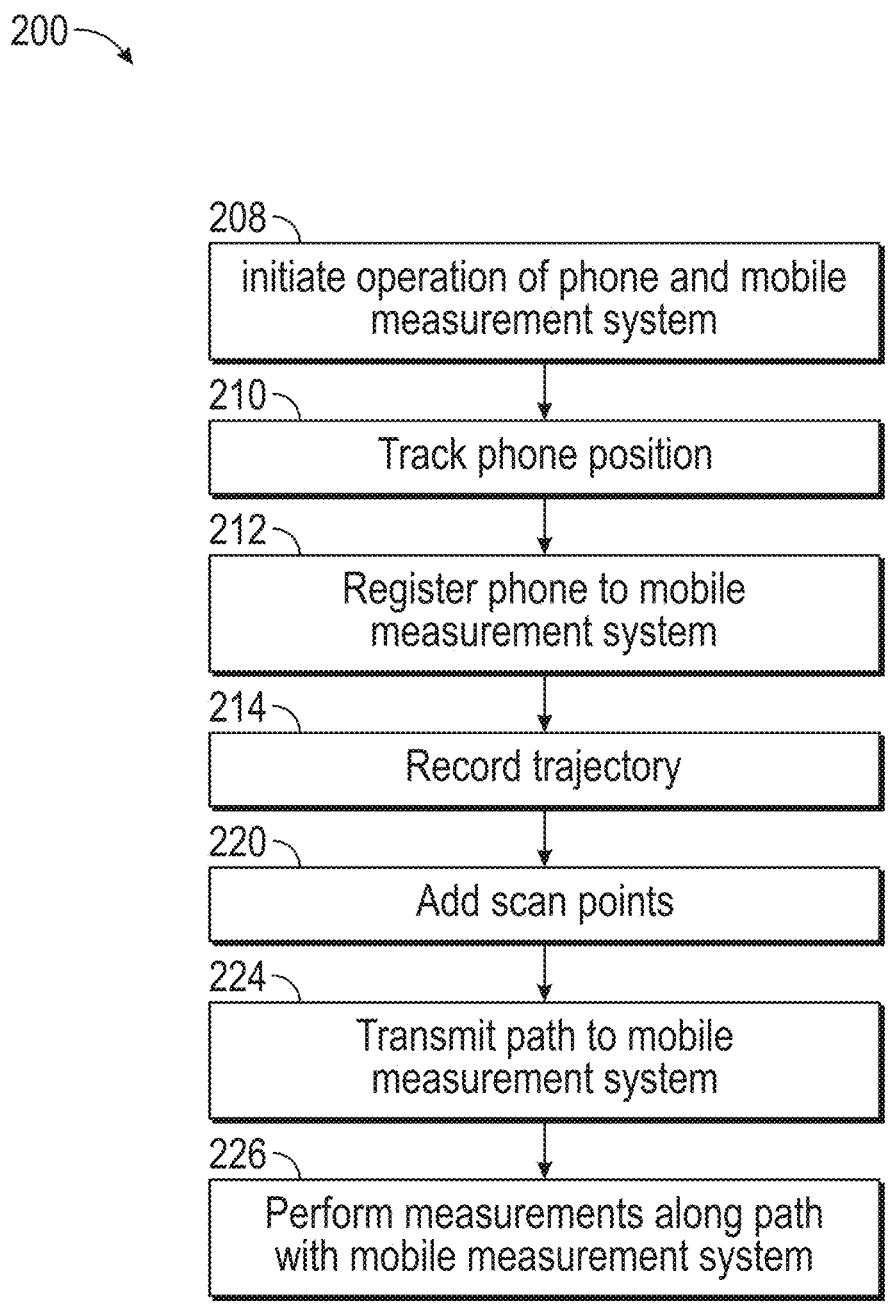
FIG. 10 is a flow diagram of a method of operating the system of FIG. 1.

The mobile computing device 25 includes a processor 134 and memory 136. The processor 134 is responsive to executable computer instructions and performs functions or control methods, such as those illustrated in FIG. 10. The processors may be microprocessors, field programmable gate arrays (FPGAs), digital signal processors (DSPs), and generally any device capable of performing computing functions. The one or more processors have access to memory for storing information. The memory 136 may include random access memory (RAM) or read-only memory (ROM) for example, for storing application code that is executed on the processor 134 and storing data, such as coordinate data for example. The mobile computing device 25 further includes communications circuits, such as NFC (ISO 14443) circuit 138, Bluetooth™ (IEEE 802.15.1 or its successors) circuit 140 and WiFi (IEEE 802.11) circuit 142 for example. The communications circuits 138, 140, 142 are transceivers, meaning each is capable of transmitting and receiving signals. It should be appreciated that the cellular phone may include additional components and circuits, such as a cellular communications circuit, as is known in the art.

In the exemplary embodiment, the mobile computing device 25 includes a display 144 that presents a graphical user interface (GUI) 146 to the user. In one embodiment, the GUI 146 allows the user to view data, such as measured coordinate data for example, and interact with the mobile computing device 25. In one embodiment, the display 144 is a touch screen device that allows the user to input information and control the operation of the mobile computing device 52 using their fingers.

In an embodiment, the mobile computing device 25 may include one or more cameras 148. In an embodiment, at least one of the cameras 148 is a depth-camera such as an RGBD type camera which acquires depth information in addition to visual information on a per-pixel basis. The depth-camera data may be sent to the processor system through wired or wireless communication channels. As will be discussed in more detail herein, the camera 148 may be used to track the position and pose of the mobile device 25 within the environment to define a trajectory along with the mobile 3D measurement system 24 will travel and perform scanning of the area or object. This allows for map planning of the route traversed by the measurement device 24 and the defining of scan locations.

In the illustrated embodiment, the camera 148 is a two-dimensional (2D) camera, sometimes referred to as an RGB camera. The combination of the 2D camera with an IMU allows the system localize itself within the environment using the visual simultaneous localization and mapping methods. In other embodiments, the camera 148 is a depth camera that may include one of two types: a central-element depth camera and a triangulation-based depth camera. A central-element depth camera uses a single integrated sensor element combined with an illumination element to determine distance ("depth") and angles from the camera to points on an object. One type of central-element depth camera uses a lens combined with a semiconductor chip to measure round-trip time of light travelling from the camera to the object and back. For example, the Microsoft Xbox™ One manufactured by Microsoft Corporation of Redmond, Wash. includes a Kinect depth camera that uses an infrared (IR) light source to illuminate a 640×480 pixel photosensitive array. This depth camera is used in parallel with a 640×480 pixel RGB camera that measures red, blue, and green colors. Infrared illumination is provided in the IR illuminators adjacent to the lens and IR array. Another example of a central-element depth camera includes a lens and a Model PhotonICs 19k-S3 3D chip manufactured by PMD Technologies of Siegen, Germany may be used in conjunction with an IR light source. The measurement distance range of this 160×120 pixel chip is scalable based on the camera layout. Many other central-element depth cameras and associated IR sources are available today. Most central-element depth cameras include a modulated light source. The light source may use pulse modulation for direct determination of round-trip travel time. In another embodiment, the light source may use continuous wave (CW) modulation with sinusoidal or rectangular waveforms to obtain round-trip travel time based on measured phase shift.

The depth-camera 148 may also be a triangulation-based depth camera. An example of such a camera is the Kinect™ of the Microsoft Xbox™ 360 manufactured by Microsoft Corporation of Redmond, Wash., which is a different Kinect™ than the Kinect™ of the Microsoft Xbox™ One described herein above. An IR light source on the Kinect™ of the Xbox™ 360 projects a pattern of light onto an object, which is imaged by an IR camera that includes a photosensitive array. The Kinect™ determines a correspondence between the projected pattern and the image received by the photosensitive array. It uses this information in a triangulation calculation to determine the distance to object points in the measurement volume. This calculation is based partly on the baseline between the projector and the IR camera and partly on the camera pattern received and projector pattern sent out. Unlike the central-element depth camera, a triangulation camera cannot be brought arbitrarily close to the light source (pattern projector) as accuracy is reduced with decreasing baseline distance.

In an embodiment, the mobile computing device 25 includes a position/orientation sensor may include inclinometers (accelerometers), gyroscopes, magnetometers, and altimeters. Usually devices that include one or more of an inclinometer and gyroscope are referred to as an inertial measurement unit (IMU) 150. In some cases, the term IMU 150 is used in a broader sense to include a variety of additional devices that indicate position and/or orientation—for example, magnetometers that indicate heading based on changes in magnetic field direction relative to the earth's magnetic north and altimeters that indicate altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices.

In an embodiment, the IMU 150 may be used in cooperation with a camera, such as camera 148 to track the position and pose of the mobile device 25 as the operator moves about in the environment. In an embodiment, the tracking is performed using a visual simultaneous localization and mapping process.

Figure 6:
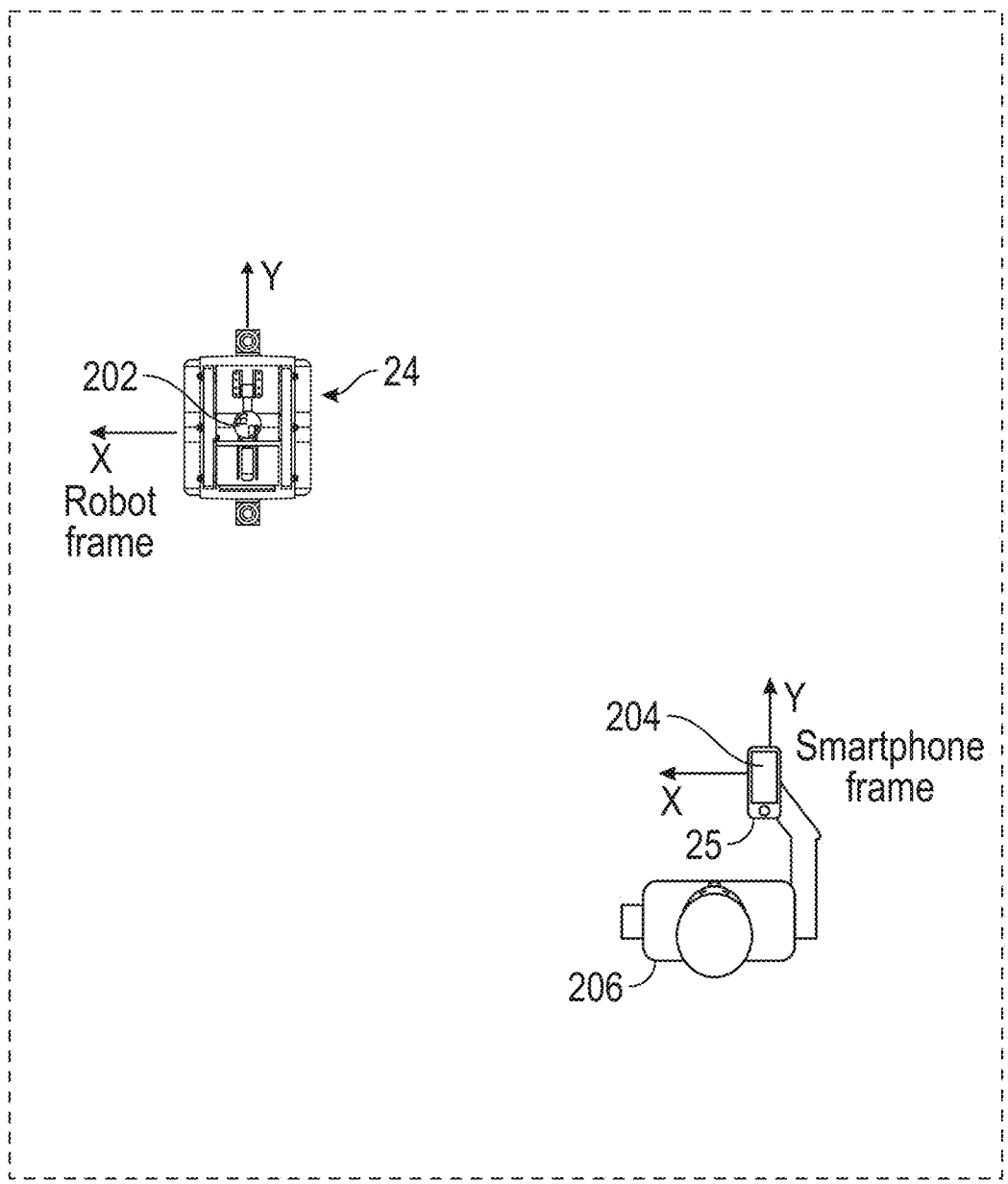
FIG. 6, FIG. 7 and FIG. 8 illustrate a method of defining a trajectory for a mobile 3D measurement device according to an embodiment.
Figure 7:
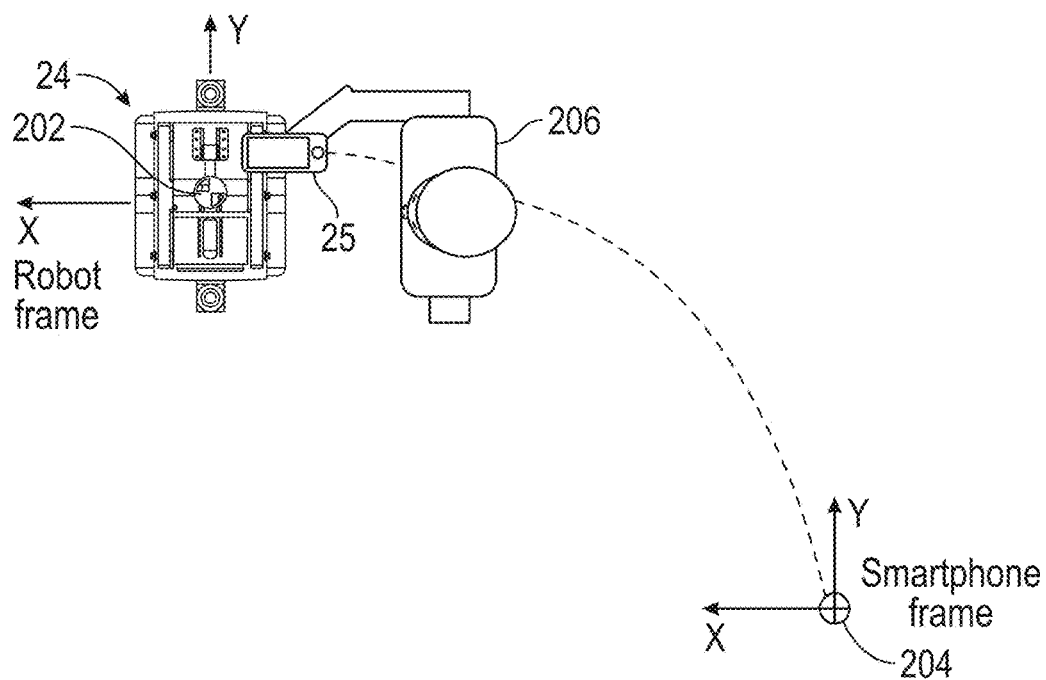
Figure 8:
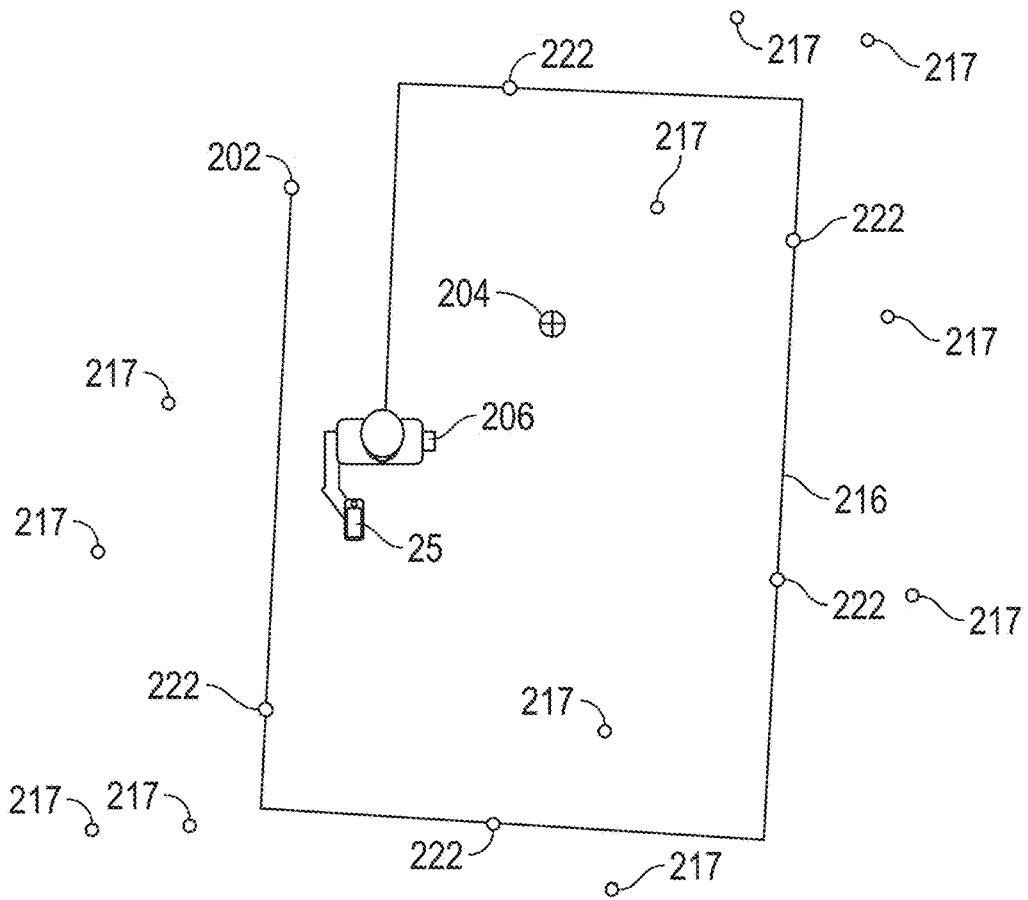
Figure 9:
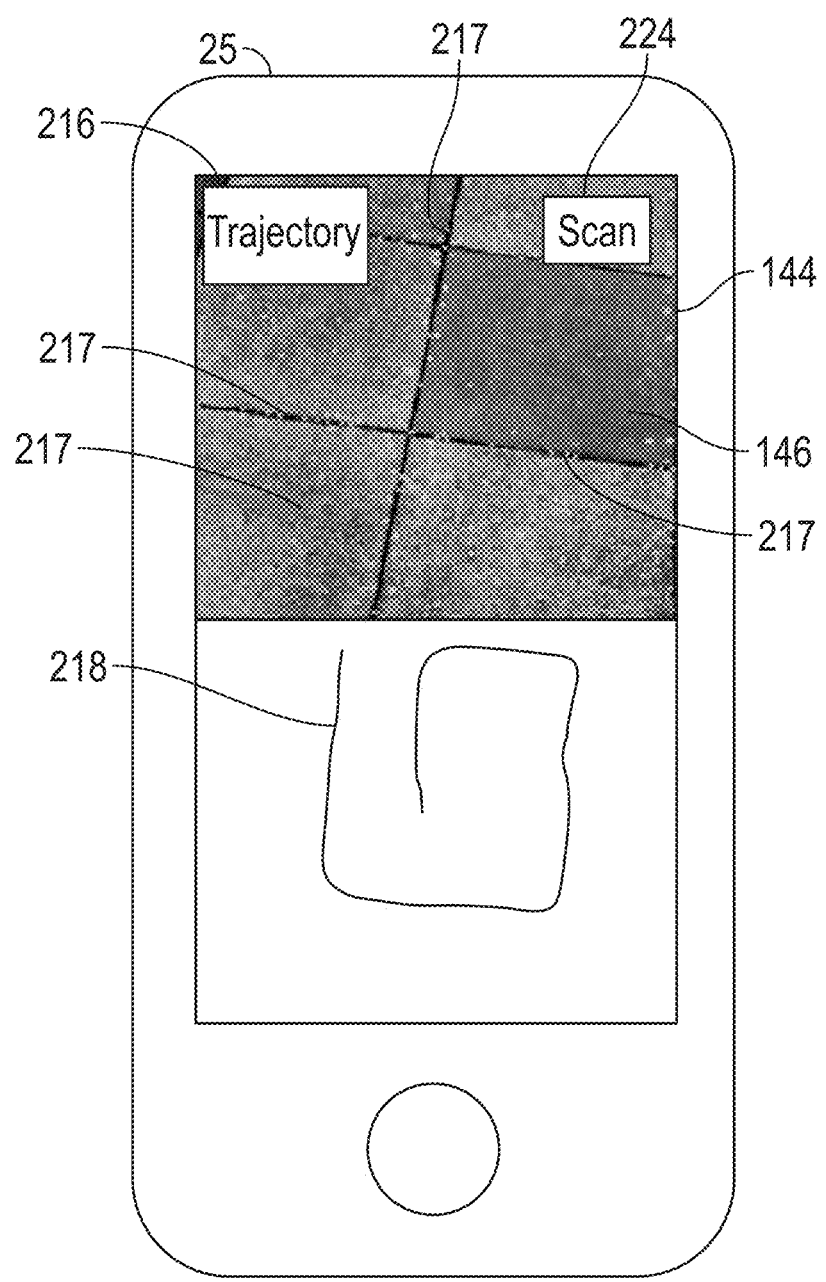
FIG. 9 illustrates mobile device used to define the trajectory of FIG. 8.

Referring now to FIGS. 6-10, an embodiment is shown of a method 200 for defining a trajectory and scan locations by the mobile 3D measurement system 24. Discussed above, both the mobile 3D measurement system 24 and the mobile device 25 are configured to track their relative position and pose within the environment. As such, both the mobile 3D measurement system 24 and the mobile device 25 have a local coordinate frame of reference 202, 204 respectively having an origin. In an embodiment, the origin for local frame of reference is the position where tracking is initiated. In the case of the mobile device, the origin 204 may be located where application software is initiated or in response to an input from the operator 206. For the mobile 3D measurement system 24, the origin 202 may be positioned where the operation of the mobile platform 26 is initiated, or may be user defined in response to an input from the operator 206. It should be appreciated that the local coordinate frame of references 202, 204 may not be co-located as shown in FIG. 6. In other words, the frame of reference 202 and be offset from the frame of reference 204.

The method 200 begins in block 208 where the operation of the mobile 3D measurement system 24 and the mobile device 25 are initiated. In the illustrated embodiment, this defines the origin for each of the local coordinate frame of references 202, 204. The method 200 then proceeds to block 210 where the position and pose of the mobile device 25 is tracked by the mobile device 25 as the mobile device 25 is moved about the environment 212. In an embodiment, the tracking is performed using an augmented reality software library routine, such as the ARKit for iOS devices provided by Apple, Inc or the ARCore library for Android devices provided by Google, Inc. In an embodiment, the localization of the mobile device 25 in the environment may be performed using a Monte Carlo localization process. It should be appreciated that as the mobile device 25 is moved, the local frame of reference 204 remains fixed. The method 200 then proceeds to block 212 where the operator 206 moves from the initial position to the mobile 3D measurement system 24. As described herein, both the mobile 3D measurement system 24 and the mobile device 25 each include an NFC circuit or module 51, 138 (FIG. 5). When the operator 206 places the mobile device 25 within a predetermined distance of the NFC module 138, the data will be exchanged therebetween. In an embodiment, the NFC module 138 is less than or equal to 1.6 inches (4 centimeters) from the NFC module 51 when communications occur.

In an embodiment, in block 212, data is wirelessly exchanged between the mobile 3D measurement system 24 and mobile device 25 via the NFC communications medium. The establishment of the data communication between the mobile 3D measurement system 24 and the mobile device 25 performs several functions. First, due to the relatively small distance between the NFC modules 51, 138 when data communication is established, the position of the mobile device relative to the local coordinate frame of reference 202 is approximately known. It should be appreciated that once this is established, the position of the frame of reference 202 relative to the frame of reference 204 is also known. In an embodiment, the coordinates of the respective frames of reference 202, 204 are exchanged between the mobile 3D measurement system 24 and the mobile device 25. In this way both devices 24, 25 know their relative position in each frame of reference 202, 204.

The establishment of the data communication further allows the transfer of identification information of both the mobile 3D measurement system 24 and the mobile device 25 to the other. This identification information may include device or network addresses that allows the mobile 3D measurement system 24 and the mobile device 25 to communicate via other communications mediums, such as but not limited to WiFI or Bluetooth™ for example.

With the mobile device 25 registered to the mobile 3D measurement system 24, the method 200 then proceeds to block 214 where the operator 206 moves about the environment along the path to record a desired trajectory 216 for the mobile 3D measurement system 24. As described herein, the mobile 3D measurement system 24 may use features 217 (e.g. edges, corners, planes) in the environment as recorded by the camera 148, in combination with the IMU 150 and visual simultaneous localization and mapping methods to determine the position of the mobile 3D measurement system 24 within the environment. In an embodiment, the trajectory 216 is a path relative to a starting point, such the position of the frame of reference 202. In an embodiment, the trajectory 214 is recorded in response to an input by the operator 206 on the mobile device 25, such as via an element 216 (FIG. 9) the GUI 146 for example. In an embodiment, the mobile device may graphically display a representation 218 the trajectory 216 on the GUI 146.

The method 200 then proceeds to block 220 where scan points 222 are added to or associated with the trajectory 216. In an embodiment, as the operator 206 is moving along the path to define the trajectory 216, the operator may provide an input, such as by selecting the graphical element 224 on GUI 146 for example, to define a position where the mobile 3D measurement system 24 will stop and perform a scan with the measurement device 28. In the illustrated embodiment, the measurement device 28 is a laser scanner that acquires coordinates of points on surfaces in a volume around the mobile 3D measurement system 24. In an embodiment, the position of the scan points 222 are stored as coordinates in either or both frames of reference 202, 204. In an embodiment, the scan points 222 are selected while the trajectory 216 is being defined.

Once the operator 206 has traversed the path that defines the trajectory, the method 200 proceeds to block 224 where the trajectory 216 and scan point 222 data is transmitted from the mobile device 25 to the mobile 3D measurement system 24. The transmission of the data may be via any suitable wireless communications such as via network 46 or directly between the devices, such as by a Bluetooth™ connection for example. The transmitted trajectory and scan point data may in the mobile device frame of reference 204, the mobile 3D measurement system frame of reference 202 or both. In an embodiment, the mobile device 25 generates a transformation matrix that transforms the trajectory 216 data from the mobile device frame of reference 204 to the mobile 3D measurement system frame of reference 202. In another embodiment, the transformation matrix is generated by the mobile 3D measurement system 24. In an embodiment, the trajectory data stored by the mobile device 25 is 3D data. In this embodiment, the 3D trajectory data is projected onto a ground plane (e.g. 2D plane parallel with the ground surface or the floor).

With the trajectory data transformed into the mobile 3D measurement system frame of reference 202, the method 200 proceed to block 226 where the mobile 3D measurement system 24 proceeds along the trajectory 216 and performs the measurements at each of the scan points 222. It should be appreciated that in some embodiments, the mobile 3D measurement system 24 does not have to follow the trajectory exactly, but may approximately follow the trajectory (e.g. within 10% of the trajectory).

It should be appreciated that in some embodiments, the mobile 3D measurement system 24 may not be able to follow the trajectory 216 due to the presence of obstacles. In these embodiments, the mobile 3D measurement system 24 may attempt to autonomously circumnavigate the obstacle using the 2D map generated by the mobile 3D measurement system 24 as described herein. In this embodiment, in the event that the mobile 3D measurement system 24 is unable to reach a defined scan point 222, the mobile 3D measurement system 24 may move as close a possible to the scan point 222 and perform the scan. Once that scan is performed, the mobile 3D measurement system 24 may then move along a route to bring the mobile 3D measurement system 24 back onto the trajectory 216.

In another embodiment, the operator 206 may desire to perform another scan of the object or the environment at a later date. It should be appreciated that the mobile device 25 may re-localize itself in the environment using augmented reality (AR) software libraries (e.g. ARKit or ARCore) and the simultaneous localization and mapping methods. In one embodiment, the relocalization is performed using Monte Carlo localization processes. In another embodiment, the relocalization may be performed using the method described in "Mapping and re-localization for mobile augmented reality", 2014 IEEE International Conference on Image Processing (ICIP), Oct. 27, 2014. In this embodiment, the mobile device 25 relocalizes and determines its relative position to the original mobile device frame of reference 204. Thus, when the mobile device 25 is registered to the mobile 3D measurement system 24, the mobile device 25 may use the same frame of reference 204 as the original trajectory. In this way, the operator 206 may transmit the original trajectory 216 to the mobile 3D measurement system 24 or define a new trajectory.

In still another embodiment, the mobile device 25 may be coupled to the mobile 3D measurement system 24 while the mobile 3D measurement system 24 moves along the trajectory 216. In an embodiment, the mobile 3D measurement system 24 tracks the position of the mobile 3D measurement system 24 and provides feedback on how closely the mobile 3D measurement system 24 is following the trajectory.

Technical effects and benefits of embodiments disclosed herein include providing a method of defining a path along which a mobile 3D measurement system will follow to perform 3D scans of an object or the environment. The defining of the path is performed using a mobile device that may be easily carried by the operator to reduce the time to program the path to the mobile 3D measurement system.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for measuring three-dimensional (3D) coordinates, the system comprising:
   a mobile three-dimensional (3D) measurement device; and
   a mobile computing device in communication with the mobile 3D measurement device, the mobile computing device having a camera and one or more first processors, the one or more first processors being operable to optically determine and track a position of the mobile computing device based on images acquired by the camera as the mobile computing device is moved within an environment, the mobile computing device further having a first communications module, the one or more first processors are responsive to nontransitory executable computer instructions when executed on the one or more first processors to perform a first set of operations comprising:
      defining a first frame of reference for the mobile computing device;
      tracking a position of the mobile computing device relative to the first frame of reference that is associated with the mobile computing device;
      defining a trajectory based on the tracking of the position in response to a first user input via the mobile computing device, the trajectory being a path to be followed by the mobile 3D measurement device to capture one or more 3D point clouds;
      defining one or more scan points in the first frame of reference in response to a second user input via the mobile computing device, the scan points being positions where the mobile 3D measurement device performs a scan to capture a 3D point cloud; and,
   the mobile 3D measurement device is operable to acquire a plurality of points on the surface of an object and determine 3D coordinates for each of the plurality of points, the mobile 3D measurement device having a second communications module, the mobile 3D measurement device further having one or more processors that are responsive to executable computer instructions when executed on the one or more processors for performing a second set of operation comprising:
      defining a second frame of reference for the mobile 3D measurement device;
      receiving the trajectory and the one or more scan points from the mobile computing device;
      moving the mobile 3D measurement device along the trajectory, which is converted to the second frame of reference for the mobile 3D measurement device; and
      in response to the mobile 3D measurement device reaching a scan point from the one or more scan points, scanning the environment to capture a 3D point cloud, the scan point is converted to the second frame of reference for the mobile 3D measurement device.

2. The system of claim 1, wherein:
   the first set of operations further comprises transmitting a signal with the first communications module when the mobile computing device is within a predetermined distance of the mobile 3D measurement device; and
   the second set of operations further comprises receiving the signal and determining a position of the mobile 3D measurement device in the first frame of reference.

3. The system of claim 1, wherein the second set of operations further comprises causing the mobile 3D measurement device to stop at a first of the one or more scan points and acquire the 3D point cloud.

4. The system of claim 1, wherein the second set of operations further comprises transforming the trajectory and one or more scan points into the second frame of reference prior to causing the mobile 3D measurement device to move along the trajectory.

5. The system of claim 1, wherein the first set of operations further comprises transforming the trajectory and one or more scan points into the second frame of reference prior to the one or more second processors receiving the trajectory.

6. The system of claim 1, wherein the mobile 3D measurement device is operable to autonomously move along a predetermined path.

7. A method of measuring 3D points, the method comprising:
   defining a first frame of reference with a mobile computing device;
   defining a second frame of reference with a mobile 3D measurement device;
   moving the mobile computing device within a predetermined distance of the mobile 3D measurement device;
   registering the first frame of reference and the second frame of reference when the mobile computing device is within the predetermined distance from the mobile 3D measurement device;
   moving the mobile computing device along a path to define a trajectory in the first frame of reference, the trajectory comprising a position of the mobile computing device that is captured in response to a first user input, the trajectory being a route to be followed by the mobile 3D measurement device to capture one or more 3D point clouds;
   capturing a set of scan points along the trajectory, a scan point being a position where the mobile 3D measurement device performs a scan to capture a 3D point cloud, a scan point is captured in response to a second user input;
   transmitting the trajectory and the set of scan points to the mobile 3D measurement device;
   moving the mobile 3D measurement device along the trajectory in response to receiving the trajectory; and
   acquiring 3D coordinates of points on an object with the mobile 3D measurement device in response to the 3D measurement device being at a scan point from the set of scan points along the trajectory.

8. The method of claim 7, further comprising transforming the trajectory from the first frame of reference to the second frame of reference.

9. The method of claim 8, wherein the transforming of the trajectory is performed by the mobile computing device prior to transmitting the trajectory to the mobile 3D measurement device.

10. The method of claim 8, wherein the transforming the trajectory is performed by the mobile 3D measurement device after receiving the trajectory from the mobile computing device.

11. The method of claim 7, wherein the one or more scan points are defined as the trajectory is defined.

12. The method of claim 11, further comprising stopping the mobile 3D measurement device at a first scan point of the one or more scan points prior to acquiring the 3D coordinates.

* * * * *